(12) United States Patent
Yasumura et al.

(10) Patent No.: US 6,670,428 B1
(45) Date of Patent: Dec. 30, 2003

(54) COMPATIBILIZING AGENT, RADICAL COPOLYMERIZABLE UNSATURATED RESIN COMPOSITION, MOLDING MATERIAL, AND MOLDED ARTICLE

(75) Inventors: Takashi Yasumura, Osaka (JP); Akira Takano, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 2 days.

(21) Appl. No.: 09/712,161

(22) Filed: Nov. 15, 2000

(30) Foreign Application Priority Data

Nov. 24, 1999 (JP) .......................................... 11-332664

(51) Int. Cl.$^7$ ...................... C08F 283/02; C08F 283/06
(52) U.S. Cl. ...................... 525/404; 525/176; 525/186; 525/187; 525/190; 525/411; 525/412; 525/445; 525/462; 525/468; 525/69
(58) Field of Search ................................ 525/404, 187, 525/445, 176, 468, 148, 462, 186, 44, 412, 190

(56) References Cited

U.S. PATENT DOCUMENTS

| | | | | |
|---|---|---|---|---|
| 3,947,422 A | * | 3/1976 | Tatum ........................ 523/457 |
| 4,172,102 A | * | 10/1979 | Hoene ......................... 525/74 |
| 4,590,242 A | | 5/1986 | Horn et al. .................. 525/183 |
| 4,670,485 A | * | 6/1987 | Hesse ......................... 523/436 |
| 5,364,909 A | * | 11/1994 | Guo ............................. 525/69 |
| 5,378,743 A | * | 1/1995 | Liedtke ....................... 523/523 |

FOREIGN PATENT DOCUMENTS

CN 1052490 A 6/1991

\* cited by examiner

*Primary Examiner*—Patricia A. Short
(74) *Attorney, Agent, or Firm*—Armstrong, Westerman & Hattori, LLP

(57) ABSTRACT

An object of the present invention is to substantially improve the compatibility between a radical copolymerizable unsaturated resin and an addition polymerized polymer (thermoplastic resin) which is added for the purpose of low profile and improvement of physical properties. The present invention provides a compatibilizing agent for compatibilizing a radical copolymerizable unsaturated resin with an addition polymerized polymer, characterized in that said compatibilizing agent is a graft copolymer (A) which contains a styrene monomer as a principal component, and has a principal chain (A1) consisting of a copolymer with a (meth)acrylate monomer and a side chain (A2) selected from a ring-opening polymerized polyether side chain consisting of a polyoxyalkylene ether, a polyester side chain, and a polycarbonate side chain, the side chain (A2) being bonded to the principal chain.

4 Claims, No Drawings

COMPATIBILIZING AGENT, RADICAL COPOLYMERIZABLE UNSATURATED RESIN COMPOSITION, MOLDING MATERIAL, AND MOLDED ARTICLE

BACKGROUND OF THE INVENTION

1. Field of the Invention

The present invention relates to a novel compatibilizing agent capable of compatibilizing a radical copolymerizable unsaturated resin with an addition polymerized polymer which is added exclusively for purposes such as low profile and improvement of physical properties, a radical copolymerizable unsaturated resin composition, a molding material, and a molded article. More particularly, the present invention provides a compatibilizing agent which remarkably improves the compatibility between two components, i.e. a radical copolymerizable unsaturated resin (e.g. an unsaturated polyester, a vinyl ester resin and a vinyl urethane resin) and an addition polymerized polymer comprising a thermoplastic resin (e.g. polystyrene, poly(methyl methacrylate), a styrene butadiene rubber, polyvinyl acetate and an acrylic rubber), and which is very useful for solving problems of preservation and molding caused by poor compatibility. Furthermore, the present invention prevents these resin mixtures from separating, and makes it possible to convert the resin mixture into a stable dispersion state, that is, a homogenous resin mixture free from separation. The present invention, because of the above effects, provides a compatibilizing agent which makes it possible to attain a high value-added product, radical copolymerizable unsaturated resin composition, a molding material, and a molded article.

2. Description of the Related Art

Radical copolymerizable unsaturated resins are suitably used as raw resins for molding materials. However, molding materials using the radical copolymerizable unsaturated resin have a large problem in which volume reduction, which occurs on curing, causes warpage and cracks in the molded article. To overcome the problem, various thermoplastic resins, for example, low profile additives such as polystyrene, styrene-butadiene rubber and the like are used. However, since these low profile additives have poor compatibility with the radical copolymerizable unsaturated resin and separation after mixing is unavoidable, the resin mixture does not convert well into a homogeneous resin mixture free from separation because of its poor separation stability. In addition, in a molded article obtained from the above resin mixture, various defects in the appearance of the molded articles, such as scumming and segregation caused by separation of a low profile additive, often occur.

Thus, various methods of adding a stabilizer as a third component have been investigated. For example, U.S. Pat. No. 3,836,600 discloses an example where a styrene-ethylene oxide block copolymer prepared by a living anion polymerization method is used as the stabilizer. This stabilizer exerts a high compatibilizing effect and can maintain a stable dispersion state for a long period of time. However, it was difficult to mass produce the stabilizer industrially because of its special synthesis procedure.

On the other hand, a method of improving the compatibility by a procedure using an addition polymerized polymer introducing a vinyl acetate block, a saturated polyester block and the like into a low profile additive has been investigated (e.g., Japanese Unexamined Patent Application, First Publication No. Hei 3-174424 and Japanese Unexamined Patent Application, First Publication No. Hei 11-92646). These improved low profile additives have the effect of retarding the time required to separate, but a stable dispersion state is still to be obtained by essentially improving the compatibility. In addition, the above technology is limited to polymers having a particular structure, and therefore convenience of suitably selecting and using various types of addition polymerized polymer as a low profile additive depending on required physical properties, usage and the like, cannot be provided.

U.S. Pat. No. 3,94,7,422 provides a copolymer of styrene and half ester maleate of polyethylene glycol as a viscosity reducing agent which is added to a molding material, such as SMC and BMC obtained by using a vinyl ester resin. However, on converting into SMC, the remaining carboxyl groups from maleic acid, are absorbed to a filler such as calcium carbonate, and therefore the excellent compatibilizing effects for the purpose of the present invention can not be obtained. In addition, by an experiment in a system consisting of only unsaturated polyester and polystyrene without any filler, the present inventors have confirmed that there are some cases of exhibiting no compatibilizing effect. Therefore, conversion of many types of unsaturated resin and an addition polymerized polymer into a homogeneous resin mixture which is free from separation and scumming, uniform coloring properties, surface smoothness, gloss, and the like, of a molded article cannot be expected, while these are expected as effects of the present invention.

BRIEF SUMMARY OF THE INVENTION

An object of the present invention is directed to essentially improve the compatibility between a radical copolymerizable unsaturated resin and an addition polymerized polymer (thermoplastic resin) which is added for the purpose of low profile and improvement of physical properties. Also an object of the present invention is to provide a compatibilizing agent which prevents molding defects caused by separation of the second component during the molding, or exhibit a stable dispersion state for a long period of time in the state of a resin mixed solution. That is, an object of the present invention is to provide a practical compatibilizing agent which makes it possible to convert the resin mixture into a homogeneous resin mixture free from separation and to eliminate defects (scumming, uniform coloring properties, surface smoothness and gloss) caused by separation during the molding by prevention of the separation between the radical copolymerizable unsaturated resin and addition polymerized polymer, which could not have been attained by the prior art, a radical copolymerizable unsaturated resin composition containing the same, a molding material, and a molded article.

The present inventors have intensively studied about these objects and found that a graft copolymer having a specific structure is very useful for the above compatibilizing agent, thus completing the present invention.

The present invention provides a compatibilizing agent for compatibilizing a radical copolymerizable unsaturated resin with an addition polymerized polymer, characterized in that said compatibilizing agent is a graft copolymer (A) which contains a styrene monomer as a principal component, and has a principal chain (A1) consisting of a copolymer with a (meth)acrylate monomer and a side chain (A2) selected from a ring-opening polymerized polyether side chain consisting of a polyoxyalkylene ether, a polyester side chain, and a polycarbonate side chain, the side chain (A2) being bonded to the principal chain (A1).

In the present invention, it is preferable to use a styrene monomer as a principal component which constitutes a principal chain (A1) of the graft copolymer (A) because of its excellent compatibilizing stability. In addition, the polyoxyalkylene ether, which constitutes a side chain (A2) in (A), is preferably a polyether containing oxyethylene units as a principal component. It is preferable in view of performance and synthesis that the number-average molecular weight is within a range 1,000–20,000, and more preferably 2,000–10,000. The present invention preferably provides a very useful radical copolymerizable unsaturated resin composition characterized in that: it comprises a compatibilizing agent, a radical copolymerizable unsaturated resin, an addition polymerized polymer and a polymerizable unsaturated monomer, the weight ratio (A1)/(A2) of the principal chain (A1) to the side chain (A2) in the graft copolymer (A) being preferably within a range of 90/10–20/80, and more preferably 80/20–20/80 (% by weight), the graft copolymer (A) being obtained by addition polymerization of an unsaturated monomer containing a styrene monomer which constitutes a principal chain (A1) as a principal component, and a macromonomer which constitutes a side chain (A2) and has a (meth)acrylic residue or styryl residue at one terminal; a molding material containing the radical copolymerizable unsaturated resin composition; and a molded article thereof.

According to the present invention, there can be obtained a practical compatibilizing agent which makes it possible to convert the resin mixture into a homogeneous resin mixture free from separation and to eliminate defects caused by separation during the molding by prevention of the separation between the radical copolymerizable unsaturated resin, and low profile additive (addition polymerized polymer) which could not have been attained by the prior art. Thus, the resin composition obtained by the compatibilizing agent of the present invention cases no separation of the low profile additive. The molding material has an excellent uniformity, therefore makes it possible to obtain a molded article having a very high quality, which is free from scumming and has excellent uniform coloring properties, surface smoothness surface gloss and the like.

DETAILED DESCRIPTION OF THE INVENTION

The present invention will be described in detail below.

The compatibilizing agent of the present invention is a graft copolymer (A) which contains a styrene monomer as a principal component and has a structure consisting of a copolymer obtained by the addition polymerization of a (meth)acrylic monomer as a principal chain (A1) and a side chain (A2) selected from a ring-opening polymerized polyether side chain which is composed of a polyoxyalkylene ether, preferably containing an oxyethylene unit as a principal component, a polyester side chain, and a polycarbonate side chain. The side chain (A2) is a structure bonded to a functional group-containing unsaturated monomer, for example, (meth)acrylic residue, monovinylbenzyl ether residue (styryl residue) and the like in a principal chain.

The monomer component which can be used to constitute a principal chain (A1) is a styrene monomer alone, or a mixture which contains a styrene monomer as a principal component in combination with (meth)acrylic monomer as the other component. Typical examples of the styrene monomer include styrene, vinyltoluene (methylstyrene), p-methylstyrene, t-butylstyrene, chlorostyrene, vinylbenzyl alkyl ether and the like.

The (meth)acrylic monomer which can be used in combination includes a known (meth)acrylic acid, hydroxyethyl (meth)acrylate, hydroxypropyl (meth)acrylate, hydroxybutyl (meth)acrylate, glycidyl (meth)acrylate, glycerin carbonate (meth)acrylate, isocyanate ethyl (meth)acrylate and (meth)acrylate ester. Typical examples of the (meth)acrylate include ester compounds of (meth)acrylic acid with a methyl, an ethyl, a propyl, a butyl, a cyclohexyl, a tert-butylcyclohexyl, a benzyl, a phenyl, an isobornyl, a dicyclopentanyl, a stearyl, a behenyl, a trifluoroethyl, which are added, if necessary.

The side chain (A2) is not limited with respect to the ◊nthesis procedure, structure or the like, as far as it is at least one side chain selected from polyether, polyester, and polycarbonate. The side chain (A2) is preferably polyether.

As the polyether, for example, there can be used those described below. As the polyester, there can be used saturated and unsaturated polyesters obtained from an $\alpha,\beta$-unsaturated carboxylic acid or a saturated carboxyric acid and an alcohol, a polyester obtained by ring-opening polymerization of caprolactone, polycaprolactone, or a polycarbonate obtained by reacting an alcohol, which is described below, with a carbonate such as dimethyl carbonate and diethyl carbonate, which is described below. These are used alone or in combination.

On the other hand, the component which can be used to constitute the ring-opening polymerized polyether. of the side chain (A2) is selected from ring-opening polymerizable monomers, which contains ethylene oxide as a principal component, and which consists of ethylene oxide alone, or other alkylene oxides capable of polymerizing with ethylene oxide or other cyclic compounds capable of ring-opening polymerizing. Other alkylene oxides include propylene oxide, butylene oxide, cyclohexene oxide, tetrahydrofuran, styrene oxide and the like.

Other cyclic compounds capable of ring-opening polymerizing include, for example, acid anhydride compounds such as succinic anhydride and phthalic anhydride, cyclic ester compounds such as caprolactone and valerolactone, and cyclic carbonate compounds such as ethylene carbonate, propylene carbonate and trimethylene carbonate. In addition to non cyclic compounds, there can be also used carbon dioxide capable of polymerizing with alkylene oxide.

The structure of polyether of a side chain (A2) containing ethylene oxide as a principal component, which is obtained by polymerizing the above cyclic compounds is not specifically limited, as far as it exhibits the compatibility with the radical copolymerizable unsaturated resin. The side chain (A2) may be, for example, a random copolymer and block copolymer of ethylene oxide and other cyclic compound. The side chain (A2) may be also extended by using ethylene oxide-type polyether polyol compounds having a molecular weight of less than 1,000 or a glycol compound, and dicarboxylic compounds, diisocyanate compounds, carbonate compounds, diglycidyl ether compounds or the like. Preferably, the number-average molecular weight is within a range of 1,000–20,000, and more preferably within a range of 2,000–10,000. The side chain (A2) may be straight-chain or branched, but straight-chain type is preferable in view of the synthesis procedure.

The number-average molecular weight of polyether of the side chain (A2) is preferably within a range of 1,000–20,000. When the number-average molecular weight of polyether of the side chain (A2) is out of this range, it is difficult to obtain sufficient effects as a compatibilizing agent. It is also difficult to obtain a homogeneous graft copolymer (A) on synthesis. The number-average molecular weight within a range of 3,000–8,000 is particularly preferable.

The amount of oxyethylene units of the side chain (A2) is preferably within a range of 20–100% by weight, and particularly within a range of 60–100% by weight, because the oxyethylene units are closely coordinated with said radical copolymerizable unsaturated resin due to an intermolecular force, functions as an anchor component, which is a very important component for stable dispersion. On the other hand, components constituting preferably 0 to 80% by weight, more preferably 0 to 40% by weight, are polyester chains and/or polycarbonate chains. The side chains may be formed of only one type of these chains. These chains may also be used with ether chains.

Examples of the method of preparing the graft copolymer (A) generally include, but are not specifically limited to, 1) a method of previously synthesizing only a principal chain (A1) and bonding a separately synthesized side chain (A2) in the polymer reaction to obtain a desired (A); 2) a method of previously synthesizing only (A1) and performing the ring-opening polymerization of a ring-opening polymerizable monomer constituting (A2) which starts from an active site in (A1); and 3) a method of the addition polymerization of a saturated monomer constituting (A1) and a macromonomer having a polymerizable function groups capable of polymerizing at one terminal of a chain pre-synthesized to obtain a desired (A), which constitutes a polyether chain (A2). The method of preparing the compatibilizing agent of the present invention is preferably a synthesis method 3) using a macromonomer, capable of easily preparing a homogenous polymer.

The polyether macromonomer which can be used in the graft copolymer of the present invention is a polymerizable functional group capable of polymerizing with an unsaturated monomer which constitutes a principal chain (A1) at one terminal of the above polyether chain (A2). The functional group is preferably an ethylenic unsaturated group. In view of polymerization properties, specific examples thereof include a (meth)acryloyl group and a styryl group are preferable, there can be also mentioned a vinyl group, a propenyl group, an allyl group, a vinyl ether group, an allyl ether group and the like. Typical example of the macromonomer, which can be used in the present invention, are those in which the compound having these functional groups is chemically bonded to the straight-chain polyether at only one terminal.

Specifically, there can be employed mono(meth)acrylate of polyethylene oxide, monovinylbenzyl ether of polyethylene oxide, monovinyl ether of polyethylene oxide, monoallyl ether of polyethylene oxide, monocrotonate of polyethylene oxide, an equimolar-reaction product between isocyanate ethyl methacrylate and polyethylene oxide, a compound obtained by bonding a hydroxyl group-containing unsaturated monomer such as hydroxyethyl (meth)acrylate and polyethylene oxide with a diisocyanate compound such as isophorone diisocyanate and the like. As a result, detailed chemical structure of the macromonomer is not specifically limited, as far as it forms a graft copolymer (A) which functions as the desired compatibilizing agent of the present invention, but employment of a half ester compound of the polyethylene oxide and maleic acid is not preferable in view of the performance.

In the graft copolymer (A), the chemical structure at a free terminal of the side chain (A2) and the structure of other terminal group than the terminal at which a polymerizable functional group of the polyether macromonomer is located are not specifically limited. The structure may have terminal derived from the synthesis conditions of the polyether chain as it is, or may be chemically converted into the other structure. The terminal functional group is preferably a hydroxyl group or an alkoxy ether group. When the molecular weight of the terminal group drastically increases, the content of the oxyethylene units in the polyether chain decreases and, therefore, the compatibilizing effects is likely to become unstable. Accordingly, a polyether side chain with a terminal group structure, which has the number of carbon atoms of 20 or less or a molecular weight of 500 or less, is preferable.

Examples of usable copolymerizable unsaturated monomer other than the styrene monomer as a principal component, which constitutes the principal chain (A1) of the graft copolymer (A), include an unsaturated carboxylic compound such as (meth)acrylic acid, fumaric acid and itaconic acid, (meth)acrylate monomer having a functional group such as a hydroxyl group and a glycidyl ether group, maleimide monomer such as N-phenyl maleimide, vinyl ester carboxylate monomer such as vinyl benzoate, diester monomer of fumaric acid, mono- and di-ester monomer of itaconic acid, vinyl ether monomer such as cyclohexylvinyl ether. These monomers can be appropriately used, if necessary.

As the principal component in the principal chain (A1), a styrene monomer is preferably used. The amount of the styrene monomer is not specifically limited, but is usually 50% by weight or more, and preferably within a range of 70–99% by weight. Particularly, a styrene monomer is preferably used. The principal chain (A1) is composed of 70–99.9% by weight of styrene monomer and 0.1–30% by weight of other unsaturated monomer including a (meth) acrylic monomer.

The weight ratio (A1/A2) of the main (A1) to the side chain (A2) in the graft copolymer (A) is within a range of 90/10–20/80, preferably within a range of 80/20–20/80, and more preferably within a range of 70/30–30/70 (% by weight). It has been confirmed that a graft copolymer (A) having a composition within a range about 60/40–50/50 (% by weight) can convert a mixture of an unsaturated polyester resin and polystyrene into a homogenous resin mixture free from separation for a long period of one month or more.

The number-average molecular weight of the graft copolymer (A) is not specifically limited, but is preferably within a range of 2,000–100,000, and more preferably within a range of 5,000–50,000. Too small and too large molecular weights give poor effect for a compatibilizing agent. The number-average molecular weight is determined by gel permeation chromatography (GPC).

The synthesis reaction of the graft copolymer (A) in the compatibilizing agent may be carried out in a solvent or without using any solvent. Usually, the reaction is carried out in a solvent in view of working properties. Any solvent may be used as far as it is a solvent in which the compatibilizing agent dissolves, and which does not disturb the synthesis of the graft copolymer. After the completion of the reaction, the copolymer (A) may be isolated from the solvent as a solid matter, or may be present in the reaction solvent. The copolymer (A) is preferably used as it is as far as it can be used as a compatibilizing agent without causing any problem. To lower the viscosity of the solution and to improve the utility, the solution can also be diluted with or redissolved in an unsaturated monomer such as styrene and organic solvent other than the reaction solvent. For example, those, which contain a graft copolymer (A) and an unsaturated monomer or a solvent, are used as a compatibilizing agent composition.

The polymerization initiator in the synthesis of the graft copolymer (A) is not specifically limited, but a radical polymerization initiator, for example, an organic peroxide such as benzoyl peroxide and an azo compound such as AIBN (azobisisobutyronitrile) can be employed. Anion and cation polymerization initiators other than radical polymerized initiator can be used as far as a desired polymer can be obtained.

The amount of the graft copolymer (A), which compatibilizes a radical copolymerizable unsaturated resin with an addition polymerized polymer (thermoplastic resin) added as a low profile additive or a physical properties-improving agent, is preferably within a range of 0.1–10 parts by weight, and more preferably within a range of 0.5–3 parts by weight based on the total of the amount of the radical copolymerizable unsaturated resin and the amount of the addition polymerized polymer as 100 parts by weight. When the amount is smaller than the above range, separation is liable to occur. On the other hand, when the amount is larger than the above range, physical properties are likely to be lowered after the curing.

The radical copolymerizable unsaturated resin composition containing the compatibilizing agent of the present invention is composed of a radical copolymerizable unsaturated resin such as, for example, unsaturated polyester, vinyl ester resin, vinyl urethane resin or acrylic resin, an addition polymerized polymer and a polymerizable unsaturated monomer. If necessary, various additives such as polymerization inhibitors, curing catalysts, fillers, reinforcers, internal mold-releasing agents, and pigments can be added.

The composition of the unsaturated polyester which can be used in the present invention includes, but is not specifically limited to, an unsaturated polyester obtained from the reaction of an α,β-unsaturated carboxylic acid or in some case, an α,β-unsaturated carboxylic acid containing a saturated carboxylic acid with a polyhydric alcohol.

Examples of the α,β-unsaturated carboxylic acid include fumaric acid, maleic acid, maleic anhydride, itaconic acid, citraconic acid, mesaconic acid, chloromaleic acid, dimethyl esters thereof and the like. These α,β-unsaturated carboxylic acids may be used alone or in combination. The saturated carboxylic acid includes, for example, phthalic acid, phthalic anhydride, isophthalic acid, terephthalic acid, HET® acid (Occidental Chemical), hexahydrophthalic anhydride, tetrahydro phthalic anhydride, adipic acid, sebacic acid, azelaic acid or the like. These saturated carboxylic acids may be used alone or in combination.

The polyhydric alcohol includes, for example, diols such as ethylene glycol, diethylene glycol, propylene glycol, dipropylene glycol, trimethylene glycol, 1,3-butane diol, 1,4-butane diol, 2-methyl-1,3-propane diol, 1,6-hexane diol, cyclohexane diol, neopentyl glycol, 2,2,4-trimethyl-1,3-pentane diol, 1,4-cyclohexane dimethanol; glycols such as hydrogenated bisphenol A, alkylene oxide adducts of hydrogenated bisphenol A, alkylene oxide adducts of bisphenol A; triols such as trimethylol propane; or tetraols such as pentaerythritol. These polyhydric alcohols may be used alone or in combination.

In addition, the resulting unsaturated polyester may be modified with an epoxy compound such as glycidyl methacrylate, and bisphenol A epoxy, or an isocyanate compound such as toluene diisocyanate and isopropenyl-dimethyl-benzyl isocyanate.

There can be also used dicyclopentadiene unsaturated polyester obtained by adding dicyclopentadiene to the α,β-unsaturated carboxylic acid, saturated carboxylic acid and polyhydric alcohol and reacting them.

A PET unsaturated polyester, which is obtained by using a glycol decomposition product obtained by reacting recovered polyethylene-terephthalate (PET) with a polyhydric alcohol at high temperature as a principal raw material, reacting it with the α,β-unsaturated carboxylic acid, saturated carboxylic acid and polyhydric alcohol, can be used in the present invention without causing any problem.

The vinyl ester resin used in the present invention is a reaction product obtained by the reaction between an epoxy resin and an unsaturated monocarboxylic acid.

The epoxy resin includes, for example, glycidyl ethers of polyvalent phenols such as bisphenol A epoxy resin, bisphenol F epoxy resin, phenol novolac epoxy resin, cresol novolac epoxy resin and brominated epoxy resin; glycidyl ethers of polyvalent alcohols such as dipropylene glycol diglycidyl ether, trimethylolpropane triglycidyl ether, diglycidyl ether of bisphenol A alkylene oxide adduct and diglycidyl ether of hydrogenated bisphenol A; alicyclic epoxy resins such as 3,4-epoxy-6-methylcyclohexylmethyl-3,4-epoxy-6-methylcyclohexane carboxylate and 1-epoxyethyl-3,4-epoxycyclohexane; glycidyl esters such as diglycidyl phthalate, diglycidyl tetrahydrophthalate, diglycidyl p-oxybenzoic acid and glycidyl dimer acid; glycidylamines such as tetraglycidylaminodiphenylmethane, tetraglycidyl m-xylylenediamine, triglycidyl p-aminophenol and N,N-diglycidylaniline; heterocyclic epoxy resins such as 1,3-diglycidyl-5,5-dimethylhydantoin and triglycidyl isocyanate; and the like. These epoxy resins may be used alone or in combination.

The unsaturated monocarboxylic acid includes, for example, acrylic acid, methacrylic acid, crotonic acid, cinnamic acid, acrylic acid dimer, monomethyl maleate, monomethyl fumarate, monocyclohexyl fumarate or sorbic acid. These acids may be used alone or in combination.

The resulting vinyl ester resin may be further modified with an acid anhydride such as maleic anhydride, succinic anhydride and acetic anhydride or an isocyanate compound such as toluene diisocyanate, isopropenyl-dimethyl-benzyl isocyanate.

A vinyl urethane resin is an oligomer obtained from polyol compounds, organic polyisocyanate compounds, or hydroxyl-containing (meth)acrylates. The polyol compound refers to a generic name of a compound having within a molecule plural hydroxyl groups, but may be a compound having a functional group which has an active hydrogen capable of reacting with an isocyanate group in place of a hydroxyl group, for example carboxyl group, amino group, mercapto group. Such a polyol compound includes, for example, polyester polyol, polyether polyol, acrylic polyol, polycarbonate polyol, polyolefin polyol, castor oil polyol, or caprolactone polyol. These polyol compounds may be used alone or in combination. As the organic polyisocyanate compound, there can be used those described below.

Typical examples of the organic polyisocyanate compound include 1,6-hexamethylene diisocyanate, trimethylhexamethylene diisocyanate, 4,4-diphenylmethane diisocyanate, tolylene diisocyanate, xylylene diisocyanate, naphthalene diisocyanate, 1,4-cyclohexane diisocyanate, 4,4-dicyclohexylmethane diisocyanate, isophorone diisocyanate, hydrogenated xylylene diisocyanate and the like. In addition, a multimer obtained by isocyanating each type of isocyanate compound can be included. They are used alone or in combination.

An acrylic resin is composed of a thermoplastic acrylic polymer derived from (meth)acrylate and a polymerizable unsaturated monomer containing (meth)acrylate as a principal component and polymerizable unsaturated monomers. It can be obtained by polymerizing a mixed monomer solution, which contains (meth)acrylate as an essential component and, if necessary, other polymerizable unsaturated monomers capable of copolymerizing with the (meth) acrylates. The acrylic polymer preferably has a molecular weight of 100,000 or less because it is used in a form of syrup dissolved in the polymerizable monomer. The acrylic polymer can be obtained by a common polymerization procedure such as suspension polymerization and solution polymerization. Also, the syrup obtained by prepolymerizing the monomers in a degree of 10–40% can be used as it is.

Typical examples of the polymerizable unsaturated monomer, which can be used in the radical copolymerizable unsaturated resin composition, include known styrenes, acrylates, methacrylates, diallylphthalates, carboxylic vinyl esters, vinyl ethers and the like. However, it is not specifically limited thereto, and can be used by suitably selecting various unsaturated monomers depending on use of the resin solution and required performance.

The amount of the polymerizable unsaturated monomer is not specifically limited, but is preferably within a range of 10–70% by weight, and more preferably within a range of 20–50% by weight, based on (modified) unsaturated polyester, vinyl ester resin, vinyl urethane resin or acrylic resin. The ratio of the radical polymerizable unsaturated resin to the polymerizable unsaturated monomer is preferably within a range from 30–90% by weight to 10–70% by weight, and more preferably within a range from 50–80% by weight to 20–50% by weight, in the resin composition.

The polymerization inhibitor, which can be used in the resin composition of the present invention, is not specifically limited and any conventionally known polymerization inhibitors can be used. Specific examples thereof include hydroquinone, trimethyl hydroquinone, p-tert-butyl catechol, tert-butyl hydroquinone, toluhydroquinone, p-benzoquinone, naphthoquinone, hydroquinone monomethyl ether, phenothiazine, copper naphthenate, copper chloride and the like. These polymerization inhibitors may be used alone, or used after mixing two or more sorts thereof, timely. The amount of the polymerization inhibitor is not specifically limited.

As the curing agent, which can be employed in the resin composition of the present invention, is not specifically limited and any conventionally known curing agents can be used. Examples thereof include one or more selected from heat-curing agents, ultraviolet-curing agents, electron radiation-curing and the like. The amount of the curing is preferably within a range of 0.1–10 parts by weight, and particularly within a range of 1–5 parts by weight based on 100 parts by weight of the resin composition.

The heat-curing agent includes an organic oxide, for example, known diacyl peroxide, peroxy ester, hydroperoxide, ketone peroxide, alkyl perester, percarbonate compounds. The heat-curing agent can be appropriately selected according to the molding condition.

Th The ultraviolet-curing agent is a photosensitizer, for example, known acylphosphine oxide, benzoyl ether, benzophenone, acetophenone, thioxantone compounds. The ultraviolet-curing agent can be appropriately selected according to the molding condition. The electron radiation-curing agent includes halogenated alkylbenzene, disulfide compounds and the like.

Examples of the additive capable of accelerating curing (curing accelerator) which is used in combination with the above described curing agent includes, but is not limited to, metal salts such as cobalt naphthenate and cobalt octonate, tertiary aromatic amines such as N,N-dimethylaniline, N,N-di(hydroxyethyl) p-toluidine and dimethylacetoacetamide and the like. They are selected, if necessary.

Typical examples of the filler, which can be used in the resin composition of the present invention, include calcium carbonate, magnesium carbonate, barium sulfate, mica, talc, kaolin, clay, Celite, asbestos, perlite, baryta, silica, quartz sand, dolomite, limestone, gypsum, aluminum fine-powder, hollow balloon, alumina, grass powder, aluminum hydroxide, white marble, zirconium oxide, antimony trioxide, titanium oxide, molybdenum dioxide and the like. These fillers are selected in view of the workability, strength and appearance of the resulting molded article, economical efficiency and the like, but calcium carbonate, aluminum hydroxide, silica, and talc are commonly used. The filler also includes surface-treated one.

The reinforcers which can be used in the resin composition of the present invention may be those which are usually used as fiber reinforcers. Examples thereof include grass fiber, polyester fiber, phenol fiber, polyvinyl alcohol fiber, aromatic polyamide fiber, nylon fiber, carbon fiber and the like. These reinforcers may be in the form of chopped strand, chopped strand mat, roving, textile and the like. These reinforcers are selected in view of the viscosity of the composition, strength of the resulting molded article and the like.

Examples of the internal mold-releasing agent which can be used in the resin composition of the present invention include higher fatty acid such as stearic acid; higher fatty acid salt such as zinc stearate; and alkyl phosphate. However, it is not specifically limited thereto and various mold-releasing agents selected suitably depending on the molding condition can be used Typical examples of the pigment, which can be used in the resin composition of the present invention include, inorganic pigments such as titanium white and carbon black, and organic pigments such as phthalocyanine blue and quinacridone red. Various pigments can be used depending on color phase. In general, the pigments are often added as a toner in which the pigments are uniformly dispersed into an unsaturated polyester resin and the like.

Other various additives includes viscosity modifiers such as viscosity reducing agents, defoaming agents, silane coupling agents, air-blocking agents such as paraffin and the like. Commercially available products can be used.

When preparing molding materials such as seat molding compound (hereinafter referred to as SMC) and bulk molding compound (hereinafter referred to as BMC), the thickening agent includes metal oxides, hydroxides such as magnesium oxide and calcium hydroxide and multifunctional isocyanate compounds such as crude MDI. However, the thickening agent is not specifically limited thereto and various thickening agents selected suitably depending on use of the molding material and required performance can be used. In general, magnesium oxide capable of easily controlling the degree of thickening is used.

In the present invention, the addition polymerized polymer (thermoplastic resin), which is mixed with the radical polymerizable unsaturated resin is not specifically limited, but an addition polymerized polymer which exerts desired effects such as low profile and improvement of physical properties (fracture toughness, etc.) can be suitably selected depending on use of molding, molding condition and the like and used. Typical examples thereof include polystyrene resin containing styrene as a principal component, for example, polystyrene, styrene-((meth)acrylic ester) copolymer, styrene-(conjugated diene) block copolymer, hydrogenated styrene-(conjugated diene) block copolymer and the like. In addition, no styrene containing (meth) acrylate polymer, for example, poly(methyl methacrylate), poly(n-butyl acrylate) ester and the like is also included. There can be also used those obtained by reacting double bonds in these polymers with other compounds.

The styrene-(conjugated diene) block copolymers are block copolymers made of styrene components obtained by polymerizing styrene with conjugated butadiene and conjugated diene components. As the conjugated diene components, there can be used butadiene, isoprene, 1,3-pentadiene and the like. In addition, styrene-hydrogenated conjugated diene block copolymer obtained by hydrogenating these styrene-(conjugated diene) block copolymer may be also used. The unit of the block copolymer is not specifically limited, but includes repeat units of styrene and conjugated diene such as styrene-(conjugated diene), styrene-(conjugated diene)-styrene, and (conjugated diene)-styrene-(conjugated diene). Specific examples thereof include styrene-butadiene block copolymer, styrene-isoprene block copolymer, styrene-(ethylene butylene) block copolymer, styrene-(ethylene propylene) block copolymer and the like.

The resin composition of the present invention can be used as, for example, a molding material (for press molding and injection molding as SMC and BMC, spray molding, hand lay-up molding, casting, pultrusion), coating material (paint, putty, cosmetic plate, sealing material, and lining material). The molding material of the present invention contains resin compositions, polymerization inhibitors, curing agent, fillers, reinforcers and if necessary, various additive such as internal mold-releasing agents and pigments.

Examples of the molding article of the present invention include house equipment such as bathtub, kitchen counter, lavatory, waterproof pan and septic tank; civil building materials such as artificial marble, panel, corrugated board, drawn material and polymer concrete; marine structures such as boat and ship; automobile parts such as lamp reflector; commodities such as buttons and boring ball; and the like.

The following Examples further illustrate the present invention, but the present invention is not limited to these examples. In the following Examples, parts are by weight unless otherwise stated.

EXAMPLES

Preparation of compatibilizing agent <Graft copolymer (A)> of the invention

Synthesis Example 1

In a 1 liter flask equipped with a thermometer, a nitrogen introducing tube, a stirrer, a condenser and a dropping funnel, 200 g of xylene as a solvent was charged and then heated to 120° C. in a nitrogen gas flow. Then, a premixed solution was prepared by dissolving 140 g of monomethoxy-polyethylene oxide-monomethacrylate with a polyether chain having a number-average molecular weight of 4,000 as a macromonomer and 2.0 g of AIBN (azobisisobutyronitrile) as a polymerization initiator in 210 g of styrene. Then, the mixed solution was added dropwise thorough a dropping funnel over about three hours to perform the addition polymerization. After the dropwise addition, the reaction product was reacted for additional eight hours with maintaining at 120° C. to obtain desired graft copolymer (A). After the completion of the reaction, the resulting resin solution was cooled to 30° C., and 440 g of styrene and 0.1 g of hydroquinone were added thereto, and the mixture was cooled to room temperature. Thus, a compatibilizing agent solution having an active component of 35% by weight was obtained, which is taken as a compatibilizing agent solution SE-1. The number-average molecular weight measured by GPC of the resulting polymer (A) was 12,000.

Synthesis Example 2

Synthesis of Compatibilizing Agent

In the same manner as in Synthesis Example 1, 200 g of xylene, 175 g of styrene, 175 g of monomethoxy-polyethylene oxide-monomethacrylate with a polyether chain having a number-average molecular weight of 4,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-2. The number-average molecular weight measured by GPC of the resulting polymer (A) was 11,000.

Synthesis Example 3

Synthesis of Compatibilizing Agent

In the same manner as in Synthesis Example 1, 200 g of xylene, 210 g of styrene, 140 g of monomethoxy-polyethylene oxide-monomethacrylate with a polyether chain having a number-average molecular weight of 6,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-3. The number-average molecular weight measured by GPC of the resulting polymer (A) was 13,000.

Synthesis Example 4

Synthesis of Compatibilizing Agent

In the same manner as in Synthesis Example 1, using 200 g of xylene, 210 g of styrene, 140 g of monomethoxy-polyethylene oxide-monomethacrylate with a polyether chain having a number-average molecular weight of 2,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-4. The number-average molecular weight measured by GPC of the resulting polymer (A) was 11,000.

Synthesis Example 5

Synthesis of Compatibilizing Agent

In the same manner as in Synthesis Example 1, using 200 g of xylene, 210 g of styrene, 35 g of methyl methacrylate, 105 g of monomethoxy-polyethylene oxide-monomethacrylate with a polyether chain having a number-average molecular weight of 4,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-5. The number-average molecular weight measured by GPC of the resulting polymer (A) was 10,000.

Synthesis Example 6

Synthesis of Compatibilizing Agent

In the same manner as in Synthesis Example 1, using 200 g of xylene, 175 g of styrene, 35 g of methacrylic acid behanyl ester, 140 g of monomethoxy-polyethylene oxide-monomethacrylate with a polyether chain having a number-average molecular weight of 4,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-6. The number-average molecular weight measured by GPC of the resulting polymer (A) was 10,500.

Synthesis Example 7

Synthesis of Compatibilizing Agent

In the same manner as in Synthesis Example 1, using 200 g of xylene, 200 g of styrene, 140 g of monomethoxy-polyethylene oxide-monovinylbenzyl ether with a polyether chain having a number-average molecular weight of 4,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-7. The number-average molecular weight measured by GPC of the resulting polymer (A) was 11,500.

Synthesis Example 8

Synthesis of Compatibilizing Agent

In the same manner as in Synthesis Example 1, using 200 g of xylene, 210 g of styrene, 140 g of monomethoxy-polyethylene, propylene oxide block copolymer monomethacrylate with a polyether chain having a number-average molecular weight of 4,000 as a macromonomer and 2.0 g of AIBN, as raw materials, were subjected to an addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-8. The number-average molecular weight measured by GPC of the resulting polymer (A) was 11,500. The content of oxyethylene units in the side chain (A2) was 80% by weight.

Synthesis Example 9

Synthesis of Compatibilizing Agent

In the same manner as in Synthesis Example 1, using 200 g of xylene, 210 g of styrene, 140 g of monomethoxy-polyethylene oxide-polycaprolactone block copolymer monomethacrylate with a side chain (A2) having a number-average molecular weight of 4,000 as a macromonomer and 2.0 g of AIBN, as raw materials, were subjected to addition polymerization to obtain a desired graft copolymer (A). Then, in the same manner as in Synthesis Example 1, 440 g of styrene and 0.1 g of hydroquinone were added thereto to obtain a compatibilizing agent solution having an active component of 35% by weight, which is taken as a compatibilizing agent solution SE-9. The number-average molecular weight measured by GPC of the resulting polymer (A) was 10,500. The content of oxyethylene units in the side chain (A2) was 80% by weight.

Synthesis Example 10

Synthesis of Comparative Compatibilizing Agent

In the same manner as in Synthesis Example 1, using 200 g of xylene, 210 g of styrene, 140 g of monomethoxy-polyethylene oxide-monomethacrylate with a polyether chain having a number-average molecular weight of 600 as a macromonomer and 2.0 g of AIBN, as raw materials, were subjected to addition polymerization to obtain a comparative graft copolymer (A). Then, in the same manner as in Synthesis Example 1, 440 g of styrene and 0.1 g of hydroquinone were added thereto to obtain a comparative compatibilizing agent solution having a solid content of 35% by weight, which is taken as a compatibilizing agent solution SE-10. The number-average molecular weight measured by GPC of the resulting polymer was 9,500.

Synthesis Example 11

Synthesis of Comparative Compatibilizing Agent

In the same manner as in Synthesis Example 1, using 200 g of xylene, 210 g of styrene, 140 g of monomethoxy-polypropylene oxide-monomethacrylate with a polyether chain having a number-average molecular weight of 4,000 as a macromonomer and 2.0 g of AIBN, as raw materials, were subjected to addition polymerization to obtain a comparative graft copolymer. Then, in the same manner as in Synthesis Example 1, 440 g of styrene and 0.1 g of hydroquinone were added thereto to obtain a comparative compatibilizing agent solution having a solid content of 35% by weight, which is taken as a compatibilizing agent solution SE-11. The number-average molecular weight measured by GPC of the resulting polymer was 10,000.

Synthesis Example 12

Synthesis of Comparative Compatibilizing Agent

In the same manner as in Synthesis Example 1, using 200 g of xylene, 210 g of styrene, 140 g of maleic acid half ester of monomethoxy-polyethylene oxide with a polyether chain having a number-average molecular weight of 4,000 and 2.0 g of AIBN, as raw materials, were subjected to addition polymerization to obtain a comparative graft copolymer. Then, in the same manner as in Synthesis Example 1, 440 g of styrene and 0.1 g of hydroquinone were added thereto to obtain a comparative compatibilizing agent solution having a solid content of 35% by weight, which is taken as a compatibilizing agent solution SE-12. The number-average molecular weight measured by GPC of the resulting polymer was 9,500.

Synthesis Example 13

Preparation of Low Profile Additive-polystyrene Solution

In the same flask as in Synthesis Example 1, 650 g of styrene was charged and then heated to 50° C. 350 g of polystyrene having a weight-average molecular weight of about 250,000 (DICSTYRENE CR-3500, manufactured by Dainippon Ink & Chemicals, Incorporated) and 0.1 g of hydroquinone were added and dissolved with stirring to obtain a resin solution having a solid content of 35% by weight, which is taken as a low profile additive solution LP-1.

Synthesis Example 14

Preparation of Low Profile Additive-styrene-butadiene Rubber Solution

In the same manner as in Synthesis Example 13, 650 g of styrene was charged and then heated to 50° C. 350 g of polymer having a styrene/rubber weight ratio of 31/69 (KRATON D-1118, manufactured by SHELL Incorporated) and 0.1 g of hydroquinone were added and dissolved with stirring to obtain a resin solution having a solid content of 35% by weight, which is taken as a low profile additive solution LP-2.

Synthesis Example 15

Preparation of Low Profile Additive-poly(methyl Methacrylate) Solution

In the same manner as in Synthesis Example 13, 650 g of styrene was charged and then heated to 50° C. 350 g of methacrylic methyl ester polymer (DIANAL BR-84, manufactured by Mitsubishi Rayon Co., Ltd.) and 0.1 g of hydroquinone were added and dissolved with stirring to obtain a resin solution having a solid content of 35% by weight, which is taken as a low profile additive solution LP-3.

Synthesis Example 16

Preparation of Low Profile Additive-polyvinyl Acetate Solution

In the same manner as in Synthesis Example 13, 650 g of styrene was charged and then heated to 50° C. 350 g of vinyl acetate polymer (DENKA ASR, M-50, manufactured by Denki Kagaku Kogyo K. K.) and 0.1 g of hydroquinone were added and dissolved with stirring to obtain a resin solution having a solid content of 35% by weight, which is taken as a low profile additive solution LP-4.

Synthesis Example 17

Preparation of Low Profile Additive-poly(n-butyl Acrylate) Solution

In the same manner as in Synthesis Example 1, using 100 g of toluene, 350 g of n-butyl acrylate and 0.4 g of AIBN, as raw materials, were subjected to addition polymerization at 50–80° C. while taking care of heat generation for about eight hours to obtain an acrylic rubber polymer. Then, toluene as a solvent was distilled off at 90° C. under reduced pressure. Then, 640 g of styrene and 0.1 g of hydroquinone were added thereto to obtain a resin solution having a solid content of 35% by weight, which is taken as a low profile additive solution LP-5.

Synthesis Example 18

Preparation of Unsaturated Resin-unsaturated Polyester Resin

In a 2 liter grass flask equipped with a nitrogen introducing tube, a reflux condenser and a stirrer, 525 g of propylene glycol and 696 g of fumaric acid were charged and then heating was started in a nitrogen gas flow. Dehydrating condensation reaction was carried out at an inner temperature of 200° C. according to a conventional procedure. When the acid number became 26 KOHmg/g, the reaction mixture was cooled to 180° C., and then 0.15 g of hydroquinone was added thereto. The mixture was further cooled to 150° C. to obtain an unsaturated polyester.

Then, the unsaturated polyester was dissolved in 430 g of styrene to obtain an unsaturated polyester resin solution having a solid content of 70% by weight, which is taken as a radical copolymerizable unsaturated resin solution VP-1.

Synthesis Example 19

Preparation of Unsaturated Resin-unsaturated Polyester Resin

In the same 2 liter flask as in Synthesis Example 18, 384 g of recycled PET (polyethylene terephthalate) flake obtained by mechanically crushing PET bottles, 320 g of propylene glycol and 0.4 g of monobutyl tin acid were charged, and then heating was started in a nitrogen gas flow. During heating, PET was gradually dissolved. When PET changed into a slurry, stirring was started. When the internal temperature was 210° C., the slurry was reacted for about four hours with maintaining at this temperature. After it was confirmed that the content changed into a clear solution, the reaction product was cooled to 120° C. At this temperature, 392 g of maleic anhydride was added and heating was started. Dehydrating condensation reaction was carried out at an inner temperature of 200° C. according to a conventional procedure. When the acid number became 25 KOHmg/g, the reaction mixture was cooled to 180° C., and then 0.15 g of hydroquinone was added thereto. The mixture was further cooled to 150° C. to obtain an unsaturated polyester.

Then, the unsaturated polyester was dissolved in 457 g of styrene to obtain an unsaturated polyester resin solution having a solid content of 70% by weight, which is taken as a radical copolymerizable unsaturated resin solution VP-2.

Synthesis Example 20

Preparation of Unsaturated Resin-unsaturated Polyester Resin

In the same 2 liter flask as in Synthesis Example 18, 433 g of propylene glycol, 588 g of maleic anhydride and 264 g of dicyclopentadiene having a purity of 95% were charged, and then heating was started in a nitrogen gas flow. The heating was carried out while taking care of heat generation. Dehydrating condensation reaction was carried out at an inner temperature of 200° C. according to a conventional procedure. When the acid number became 30 KOHmg/g, the reaction mixture was cooled to 180° C., and then 0.16 g of hydroquinone was added thereto. The mixture was further cooled to 150° C. to obtain a unsaturated polyester.

Then, the unsaturated polyester was dissolved in 510 g of styrene to obtain an unsaturated polyester resin solution having a solid content of 70% by weight, which is taken as a radical copolymerizable unsaturated resin solution VP-3.

Synthesis Example 21

Preparation of Unsaturated Resin-vinyl Ester Resin

In a 2 liter four-necked flask equipped with a nitrogen and air introducing tube, 826 g of bisphenol A epoxy resin (epoxy eq. of 410), 174 g of methacrylic acid and 0.4 g of hydroquinone were charged and then heated to 90° C. in a flow of a mixed gas of nitrogen and oxygen in a ratio of 1:1. Then, 2.0 g of 2-methylimidazol was added and the mixture was heated to 105° C. to react for ten hours to obtain a vinyl ester resin.

Then, the vinyl ester resin was dissolved in 430 g of styrene and 0.15 g of toluhydroquinone to obtain a vinyl ester resin having a solid content of 70%, which is taken as a radical copolymerizable unsaturated resin solution VP-4.

Synthesis Example 22

Preparation of Unsaturated Resin-vinyl Ester Resin

In a 2 liter four-necked flask equipped with a nitrogen and air introducing tube, 680 g of bisphenol A epoxy resin (epoxy eq. of 182), 320 g of methacrylic acid and 0.4 g of hydroquinone were charged and then heated to 90° C. in a flow of a mixed gas of nitrogen and oxygen in a ratio of 1:1. Then, 2.0 g of 2-methylimidazol was added and the mixture was heated to 105° C. to react for ten hours. The reaction product was cooled to 90° C., and then 150 g of styrene, 0.7 g of toluhydroquinone and 140 g of maleic anhydride was added the reaction was conducted for three hours to obtain a vinyl ester resin.

Then, 339 g of styrene was mixed to obtain a vinyl ester resin having a solid content of 70%, which is taken as a radical copolymerizable unsaturated resin solution VP-5.

Synthesis Example 23

Preparation of Unsaturated Resin-vinyl Urethane Resin

In the same 2 liter flask as in Synthesis Example 21, 500 g of ethylene oxide adduct of bisphenol A (molecular weight of 500), 448 g of isophorone dicyanate were charged and then the mixture was reacted at 90° C. in a nitrogen:oxygen 1:1 mixed gas flow. Then, to the reaction product, 273 g of 2-hydroxyethyl methacrylate and 0.15 g of hydroquinone were added and the mixture was heated to 90° C. to react for six hours to obtain a vinyl urethane resin.

Then, the vinyl urethane resin was dissolved in 523 g of styrene to obtain a vinyl urethane resin having a solid content of 70%, which is taken as a radical copolymerizable unsaturated resin solution VP-6.

Preparation of Resin Composition and Evaluation of Mixing Stability

Example 1

In a 200 cc grass bottle, 76 parts of unsaturated resin solution (VP-1) obtained in Synthesis Example 18, 20 parts of low profile additive solution (LP-1) obtained in Synthesis Example 13, 4 parts of styrene and 3 parts of compatibilizing agent solution (SE-1) obtained in Synthesis Example 1 (an active component of about 1 part) were charged, and then mixed in a stirrer at 2500 rpm for five minutes to obtain a resin mixed solution (resin composition).

The resulting resin mixed solution was allowed to stand under room temperature, and dispersion stability was visually evaluated. The time and day required to separation were evaluated by six-rank criteria. The state where the phase was separated up to the height of about 2 mm or higher due to observation from the side during the storage in the above container was taken as a time required to separation.

Evaluation of Compatibility

1: After mixing, separation occurred within 4 hours.
2: After mixing, separation occurred during not less than 4 hours and less than 12 hours.
3: After mixing, separation occurred during 12 hours or more and less than 24 hours.
4: After mixing, separation occurred during 24 hours or more and less than 10 days.
5: After mixing, separation occurred during 10 days or more and less than 30 days.
6: After mixing, no separation occurred during 30 days or more and stable.

The composition obtained in Example 1 showed the dispersion stability of 6 and was stable during one month or more.

Examples 2–9

In the same manner as in Example 1, except that the compatibilizing agent solution was changed to SE-2–9 obtained in Synthesis Examples 2–9 respectively, resin compositions were prepared. The stability of the solutions was evaluated in the same manner as in Example 1. The results are shown in Tables 1 and 2, including the results of Example 1

TABLE 1

| Items | | Examples | | | | | |
|---|---|---|---|---|---|---|---|
| | | 1 | 2 | 3 | 4 | 5 | 6 |
| Components | Compatibilizing agent (A) solution | SE-1 | SE-2 | SE-3 | SE-4 | SE-5 | SE-6 |
| | Side chain (A2) | PEO4000 | PEO4000 | PEO6000 | PEO2000 | PEO4000 | PEO4000 |
| | Principal chain (A1) | SM | SM | SM | SM | SM, MMA | SM, VMA |
| | Weight ratio A1/A2 | 61/39 | 51/49 | 61/39 | 61/39 | 71/29 | 61/39 |
| | Unsaturated resin solution | VP-1 UP | VP-1 UP | VP-1 UP | VP-1 UP | VP-1 UP | VP-1 UP |

TABLE 1-continued

|  |  | Examples | | | | | |
| --- | --- | --- | --- | --- | --- | --- | --- |
| Items |  | 1 | 2 | 3 | 4 | 5 | 6 |
| Evaluation | Low profile additive solution | LP-1 PS | LP-1 PS | LP-1 PS | LP-1 PS | LP-1 PS | LP-1 PS |
|  | Resin solution stability | 6 | 6 | 6 | 4 | 6 | 6 |
|  | (Days required to separation) | >30 | >30 | >30 | 7 | >30 | >30 |

Comparative Example 1

In the same manner as in Example 1, except that no compatibilizing agent solution was added, a resin composition was prepared. The stability of the solution was evaluated in the same manner as in Example 1. The results are shown in Table 2.

Comparative Examples 2 and 3

In the same manner as in Example 1, except that the compatibilizing agent solution was changed to SE-10 and 11 obtained in Synthesis Examples 10 and 11 respectively, resin compositions were prepared. The stability of the solutions was evaluated in the same manner as in Example 1. The results are summarized in Table 2.

TABLE 2

|  |  | Examples | | | Comp. Examples | | |
| --- | --- | --- | --- | --- | --- | --- | --- |
| Items |  | 7 | 8 | 9 | 1 | 2 | 3 |
| Components | Compatibilizing agent (A) solution | SE-7 | SE-8 | SE-9 | None | SE-10 | SE-11 |
|  | Side chain (A2) | PEO4000 | PE-Block | PE-Block |  | PEO600 | PPO4000 |
|  | Principal chain (A1) | SM | SM | SM |  | SM | SM |
|  | Weight ratio A1/A2 | 61/39 | 61/39 | 61/39 |  | 64/36 | 61/39 |
|  | Unsaturated resin solution | VP-1 UP | VP-1 UP | VP-1 UP | VP-1 UP | VP-1 UP | VP-1 UP |
|  | Low profile additive solution | LP-1 PS | LP-1 PS | LP-1 PS | LP-1 PS | LP-1 PS | LP-1 PS |
| Evaluation | Resin solution stability | 6 | 5 | 5 | 1 | 3 | 2 |
|  | (Days required to separation) | >30 | 21 | 25 | <1 | 1 | <1 |

Description of Abbreviation in Table

SM: Styrene, MMA: Methyl methacrylate, VMA: Behenyl methacrylate, PEO: Polyethylene oxide, PPO: Polypropylene oxide, PE-Block: Polyethylene oxide-block copolymer, PS: Polystyrene, UP: Unsaturated polyester resin

Examples 10–13

In the same manner as in Example 1, except that the low profile additive solution was changed to LP-2–5 obtained in Synthesis Examples 14–17 respectively, resin compositions were prepared. The stability of the solutions was evaluated in the same manner as in Example 1. The results are shown in Table 3.

Comparative Examples 4–7

In the same manner as in Examples 10–13, except that no compatibilizing agent solution was added, resin compositions were prepared. The stability of the solution was evaluated in the same manner as in Example 1. The results are shown in Table 4.

TABLE 3

|  |  | Examples | | | |
| --- | --- | --- | --- | --- | --- |
| Items |  | 10 | 11 | 12 | 13 |
| Components | Compatibilizing agent (A) solution | SE-1 | SE-1 | SE-1 | SE-1 |
|  | Side chain (A2) | PEO4000 | PEO4000 | PEO4000 | PEO4000 |
|  | Principal chain (A1) | SM | SM | SM | SM |
|  | Weight ratio A1/A2 | 61/39 | 61/39 | 61/39 | 61/39 |
|  | Unsaturated resin solution | VP-1 UP | VP-1 UP | VP-1 UP | VP-1 UP |
|  | Low profile additive solution | LP-2 SBR | LP-3 PMMA | LP-4 PVAc | LP-5 PBA |
| Evaluation | Resin solution stability | 6 | 5 | 6 | 6 |
|  | (Days required to separation) | >30 | 20 | >30 | >30 |

TABLE 4

|  |  | Comp. Examples | | | |
| --- | --- | --- | --- | --- | --- |
| Items | | 4 | 5 | 6 | 7 |
| Components | Compatibilizing agent (A) solution | none | none | none | None |
| | Unsaturated resin solution | VP-1 UP | VP-1 UP | VP-1 UP | VP-1 UP |
| | Low profile additive solution | LP-2 SBR | LP-3 PMMA | LP-4 PVAc | LP-5 PBA |
| Evaluation | Resin solution stability | 1 | 1 | 5 | 1 |
| | (Days required to separation) | <1 | <1 | 21 | <1 |

Description of Abbreviation in Table

SM: Styrene, PEO: Polyethylene oxide, PS: Polystyrene, SBR:
   Styrene butadiene rubber, PMMA: Poly(methyl methacrylate),
PVAC: Polyvinyl acetate, PBA: Poly(n-butyl acrylate), PS:
   Polystyrene, UP: Unsaturated polyester resin

Examples 14–18

In the same manner as in Example 1, except that the unsaturated resin solution was changed to VP-2–6 obtained in Synthesis Examples 19–23 respectively, resin compositions were prepared. The stability of the solutions was evaluated in the same manner as in Example 1. The results are shown in Table 5.

Comparative Examples 8–12

In the same manner as in Examples 14–18, except that no compatibilizing agent solution was added, resin compositions were prepared. The stability of the solution was evaluated in the same manner as in Example 1. The results are shown in Table 6.

TABLE 5

|  |  | Examples | | | | |
| --- | --- | --- | --- | --- | --- | --- |
| Items | | 14 | 15 | 16 | 17 | 18 |
| Components | Compatibilizing agent (A) solution | SE-1 | SE-1 | SE-1 | SE-1 | SE-1 |
| | Side chain (A2) | PEO4000 | PEO4000 | PEO4000 | PEO4000 | PEO4000 |
| | Principal chain (A1) | SM | SM | SM | SM | SM |
| | Weight ratio A1/A2 | 61/39 | 61/39 | 61/39 | 61/39 | 61/39 |
| | Unsaturated resin solution | VP-2 UP | VP-3 UP | VP-4 VE | VP-5 VE | VP-6 VU |
| | Low profile additive solution | LP-1 PS | LP-1 PS | LP-1 PS | LP-1 PS | LP-1 PS |
| Evaluation | Resin solution stability | 6 | 6 | 6 | 6 | 6 |
| | (Days required to separation) | >30 | >30 | >30 | >30 | >30 |

TABLE 6

|  |  | Comp. Examples | | | | |
| --- | --- | --- | --- | --- | --- | --- |
| Items | | 8 | 9 | 10 | 11 | 12 |
| Components | Compatibilizing agent (A) solution | none | none | none | none | none |
| | Unsaturated resin solution | VP-2 UP | VP-3 UP | VP-4 VE | VP-5 VE | VP-6 VU |
| | Low profile additive solution | LP-1 PS | LP-1 PS | LP-1 PS | LP-1 PS | LP-1 PS |
| Evaluation | Resin solution stability | 1 | 1 | 1 | 1 | 1 |
| | (Days required to separation) | <1 | <1 | <1 | <1 | <1 |

Description of Abbreviation in Table

SM: Styrene, PEO: Polyethylene oxide, PS: Polystyrene, UP:
   Unsaturated polyester resin, VE: Vinyl ester resin, VU: Vinyl urethane resin

Example 19

Preparation of Molding Material and Molded Article

To 80 parts of unsaturated resin (VP-1) obtained in Synthesis Example 18, 25 parts of low profile additive solution (LP-1) obtained in Synthesis Example 13, 3 parts of compatibilizing agent solution (SE-1) obtained in Synthesis Example 1, 0.06 parts of p-benzoquinone, 4 parts of zinc stearate, 140 parts of calcium carbonate, 10 parts of pigment toner (POLYTONGRAY PT-8809, manufactured by Dainippon Ink & Chemicals, Incorporated) and 1.0 part by curing agent BIC-75 (manufactured by Kayaku Akzo Corporation) were mixed and sufficiently stirred until they are uniformly dispersed to form a compound. One day after the preparation, 1.0 part of magnesium oxide as a thickening agent was added to the resulting compound, followed by mixing with stirring. Then, grass fibers having a fiber length of 1 inch as a reinforcer were impregnated with the mixture to obtain sheet-like SMC (molding material). The resulting SMC was protected with a polyethylene film on both surfaces, wrapped with an aluminum-deposited film and stored. The grass content (GC%) of the SMC was adjusted to 28%.

The SMC (molding material) obtained thus was aged at 40° C. for 24 hours, allowed to stand at normal temperature, and then stored. Three days after the preparation, the SMC was supplied in a mold (an upper mold is heat-controlled to 145° C. and a lower mold is heat-controlled to 135° C.) and maintained under a pressure of 70 kgf/cm$^2$ (plane pressure) for five minutes to mold into a 30×30 cm plate having a thickness of 3 mm. The scumming, uniform coloring properties, surface smoothness and luster of the resulting molding articles were evaluated in the following procedures. The results are shown in Table 7.

Evaluation of Appearance of Molded Article

Evaluation of scumming: The presence or absence of scumming is visually judged.

Evaluation of uniform coloring properties: Visual evaluation as well as measurement of L values (12 points or more) in a distance of 1 cm on a arbitrary line of a molding article are conducted using a color difference meter ("COLOR MACHINE Σ80" manufactured by Nippon Denshoku Industries Co., Ltd.). The average of the L values is calculated and, using the calculated value as a standard, dispersion (standard deviation) of the L values is calculated, which is taken as an index.

Evaluation of surface smoothness: Visual evaluation as well as determination of a quadric differential coefficient of the surface irregularity are conducted using a surface distortion meter "SURFMATIC" (Tokyo Boeki, Ltd.).

Surface gloss: It is evaluated visually and by gloss at 60° C. using a glossmeter (Murakami Color Research Laboratory: GM26D).

Evaluation Criteria
  Good: ⊚>○>Δ>X: Poor
Uniform Coloring Properties
  ⊚: Any segregation is not visually observed, but dispersion (standard deviation) of the L values is 0.5 or less.
  ○: Segregation is scarcely observed visually, but dispersion (standard deviation) of the L values is 0.7 or less.
  Δ: Slight segregation is visually observed, but dispersion (standard deviation) of the L values is more than 0.7 and less than 1.0.
  X: Clear segregation is visually observed but, dispersion (standard deviation) of the L values is 1.0 or more.
Surface Smoothness
  ⊚: Quadratic differential coefficient is 500 or less.
  ○: Quadratic differential coefficient is 700 or less.
  Δ: Quadratic differential coefficient is more than 700 and less than 1000.
  X: Quadratic differential coefficient is 1000 or more.
Surface Gloss
  ⊚: Gloss at 60° C. is 90 or more.
  ○: Gloss at 60° C. is 85 or more.
  Δ: Gloss at 60° C. is not less than 80 and less than 85.
  X: Gloss at 60° C. is 80 or less.

Example 20

In the same manner as in Example 19, except that the unsaturated resin was changed to VP-5 obtained in Synthesis Example 22, and the low profile additive was changed to LP-2 obtained in Synthesis Example 14, a SMC was prepared to obtain a molded article. Then, the same evaluations were conducted. The results are shown in Table 7.

Example 21

In the same manner as in Example 19, except that the unsaturated resin was changed to VP-2 obtained in Synthesis Example 19, a SMC was prepared to obtain a molded article. Then, the same evaluations were conducted. The results are shown in Table 7.

Example 22

In the same manner as in Example 19, except that the compatibilizing agent was changed to SE-6 obtained in Synthesis Example 6, and the unsaturated resin was changed to VP-3 obtained in Synthesis Example 20, a SMC was prepared to obtain a molded article. Then, the same evaluations were conducted. The results are shown in Table 7.

Comparative Example 13

In the same manner as in Example 19, except that no compatibilizing agent was used, a SMC was prepared to obtain a molded article. Then, the same evaluations were conducted. The results are shown in Table 7.

Comparative Example 14

In the same manner as in Example 19, except that the compatibilizing agent was changed to SE-12 obtained in Synthesis Example 12, and the unsaturated resin was changed to VP-3 obtained in Synthesis Example 20, a SMC was prepared to obtain a molded article. Then, the same evaluations were conducted. The results are shown in Table 7.

TABLE 7

| | | Examples | | | | Comp. Examples | |
|---|---|---|---|---|---|---|---|
| Items | | 19 | 20 | 21 | 22 | 13 | 14 |
| Components | Compatibilizing agent (A) solution | SE-1 | SE-1 | SE-1 | SE-6 | None | SE-12 |
| | Side chain (A2) | PEO4000 | PEO4000 | PEO4000 | PEO4000 | | PEO4000 |
| | Principal chain (A1) | SM | SM | SM | SM, VMA | | SM |
| | Weight ratio A1/A2 | 61/39 | 61/39 | 61/39 | 61/39 | | 61/39 |
| | Unsaturated resin solution | VP-1 UP | VP-5 VE | VP-2 UP | VP-3 UP | VP-1 UP | VP-3 UP |
| | Low profile additive solution | LP-1 PS | LP-2 SBR | LP-1 PS | LP-1 PS | LP-1 PS | LP-1 PS |

TABLE 7-continued

| Items | | Examples | | | | Comp. Examples | |
|---|---|---|---|---|---|---|---|
| | | 19 | 20 | 21 | 22 | 13 | 14 |
| Evaluation | Presence or absence of scumming | No scumming | No scumming | No scumming | No scumming | Scumming present | Scumming present |
| | Uniform coloring properties | ⊚ | ⊚ | ⊚ | ⊚ | x | Δ |
| | Surface smoothness | ⊚ | ○ | ○ | ⊚ | Δ | Δ |
| | Gloss | ⊚ | ⊚ | ⊚ | ○ | Δ | Δ |

Description of abbreviations in Table

SM: Styrene, VMA: Behenyl methacrylate, PEO: Polyethylene oxide, PS: Polystyrene, SBR: Styrene butadiene rubber, UP:

Unsaturated polyester resin, VE: Vinyl ester resin

As is apparent from the results described in Table 1 to Table 6, high compatibilizing effect can be obtained in any of Examples 1 to 18 using the compatibilizing agent solutions SE-1–9 which satisfy the conditions of the present invention, and separation of the resin solutions hardly occurred. On the other hand, in case of using no compatibilizing agent, and in Comparative Examples 1–12 using the compatibilizing agent solutions SE-10 and 11 which do not satisfy the conditions of the present invention, sufficient compatibilizing effect could not be obtained, and phase separation occurred within one day (Comparative Example 6 using LP-4 is excepted).

As is apparent from the results of Examples 19–22 described in Table 7, in any case, the compatibilizing agent of the present invention made it possible to obtain a molded article which is free from scumming and has excellent uniform coloring properties, surface smoothness and surface gloss, molding defects caused by separation of the low profile additive of which are being improved by the compatibilizing agent. Since Comparative Examples 13 and 14 do not satisfy the conditions of the present invention, molding defects caused by separation of the low profile additive occurred, thus they had poor practical properties.

What is claimed is:

1. A compatibilizing agent for compatibilizing a radical copolymerizable unsaturated resin with an addition polymerized polymer, characterized in that said compatibilizing agent is a graft copolymer (A) which has a principal chain (A1) consisting of a copolymer of a styrene monomer as a principal component with a (meth)acrylate monomer and a side chain (A2) selected from a ring-opening polymerized polyether side chain consisting of a polyoxalkylene, a polyester side chain, and a polycarbonate side chain, the side chain (A2) being bonded to the principal chain, wherein the weight ratio (A1/A2) of the principal chain (A1) to the side chain (A1) to the side chain (A2) of the graft copolymer (A) is within a range of 65/35–20/80 (% by weight).

2. A compatibilizing agent according to claim 1, wherein the number-average molecular weight of the side chain (A2) of the graft copolymer (A) is within a range of 1,000–20,000.

3. A compatibilizing agent according to claim 1, wherein the side chain (A2) of the graft copolymer (A) contains oxyethylene units within a range of 20–100% by weight.

4. A compatibilizing agent according to claim 1, wherein the graft copolymer (A) is obtained by addition polymerization of unsaturated monomers, which constitute a principal chain (A 1), containing a styrene monomer as a principal component and a (meth)acrylate monomer, and a macromonomer which constitutes a side chain (A2) and has a (meth)acrylic residue or styryl residue at one terminal.

* * * * *